United States Patent
d'Herbemont et al.

(10) Patent No.: US 10,367,879 B2
(45) Date of Patent: Jul. 30, 2019

(54) DOWNLOAD PRIORITIZATION

(71) Applicant: Apple Inc., Cupertino, CA (US)

(72) Inventors: Pierre d'Herbemont, Paris (FR);
Alexandre Laborie, Vanves (FR);
Rony Fadel, Paris (FR); Amaury Patard de la Vieuville, Le Chesnay (FR)

(73) Assignee: Apple Inc., Cupertino, CA (US)

(*) Notice: Subject to any disclaimer, the term of this patent is extended or adjusted under 35 U.S.C. 154(b) by 11 days.

(21) Appl. No.: 15/275,158

(22) Filed: Sep. 23, 2016

(65) Prior Publication Data

US 2017/0359404 A1    Dec. 14, 2017

Related U.S. Application Data

(60) Provisional application No. 62/348,608, filed on Jun. 10, 2016.

(51) Int. Cl.
*H04L 29/08* (2006.01)

(52) U.S. Cl.
CPC .......... *H04L 67/06* (2013.01); *H04L 67/1097* (2013.01)

(58) Field of Classification Search
CPC .. H04L 67/06; H04L 67/1095; H04L 67/1097
USPC ....................................................... 709/219
See application file for complete search history.

(56) References Cited

U.S. PATENT DOCUMENTS

| | | | | |
|---|---|---|---|---|
| 8,099,482 | B2* | 1/2012 | Clark | G06Q 30/0264 709/207 |
| 8,892,720 | B2 | 11/2014 | Diaz | |
| 9,037,638 | B1* | 5/2015 | Lepeska | H04L 67/2847 709/203 |
| 9,372,716 | B1* | 6/2016 | Ramani | G06F 9/46 |
| 9,559,889 | B1* | 1/2017 | Vincent | H04L 29/08522 |
| 2003/0220984 | A1* | 11/2003 | Jones | H04L 29/06 709/219 |
| 2006/0041603 | A1* | 2/2006 | Paterson | G06F 17/30581 |
| 2006/0047775 | A1 | 3/2006 | Bruck et al. | |
| 2007/0038567 | A1* | 2/2007 | Allaire | G06Q 30/0239 705/50 |
| 2007/0136375 | A1 | 6/2007 | Proctor et al. | |
| 2008/0242221 | A1* | 10/2008 | Shapiro | G06Q 30/02 455/3.06 |
| 2011/0185041 | A1* | 7/2011 | Hunt | H04L 65/1069 709/219 |
| 2012/0079095 | A1* | 3/2012 | Evans | G06F 8/61 709/224 |

(Continued)

*Primary Examiner* — David R Lazaro
*Assistant Examiner* — Berhanu Shitayewoldetadik
(74) *Attorney, Agent, or Firm* — Womble Bond Dickinson (US) LLP

(57) ABSTRACT

A method and apparatus of a device that downloads an object from a cloud service provider is described. In an exemplary embodiment, the device receives a download request for the object from a process running on a device. The device further determines a priority hint associated with the process for the download request. In addition, the device starts a download process using the download request and the priority hint. Furthermore, the device determines a change in the priority hint of the process during the download. The device additionally changes a characteristic of the download process in response to the change in the priority hint. The device further stores the object.

21 Claims, 11 Drawing Sheets

(56) References Cited

U.S. PATENT DOCUMENTS

| | | | |
|---|---|---|---|
| 2012/0179653 A1* | 7/2012 | Araki | G06F 17/30575 |
| | | | 707/634 |
| 2012/0191803 A1* | 7/2012 | Ray | G06F 21/125 |
| | | | 709/217 |
| 2012/0259926 A1* | 10/2012 | Lockhart | H04L 51/10 |
| | | | 709/206 |
| 2012/0331088 A1* | 12/2012 | O'Hare | G06F 21/6227 |
| | | | 709/214 |
| 2013/0080516 A1 | 3/2013 | Bologh | |
| 2014/0089467 A1* | 3/2014 | Beck | H04L 67/02 |
| | | | 709/219 |
| 2014/0149850 A1* | 5/2014 | Khorashadi | G06F 17/30905 |
| | | | 715/235 |
| 2014/0282130 A1* | 9/2014 | Goldstein | G06F 17/248 |
| | | | 715/762 |
| 2015/0142866 A1* | 5/2015 | Dong | G06F 17/30575 |
| | | | 709/201 |

* cited by examiner

DOWNLOAD PRIORITIZATION

RELATED APPLICATIONS

Applicant claims the benefit of priority of prior, provisional application Ser. No. 62/348,608, filed Jun. 10, 2016, the entirety of which is incorporated by reference.

FIELD OF INVENTION

This invention relates generally to network and more particularly to prioritizing object downloads from a server to a client.

BACKGROUND OF THE INVENTION

A user can utilize a cloud service to store files and other objects that are accessible to a local client via a variety of means. In particular, the cloud service can be a file hosting service that is accessible by various services of the operating system and applications of the local client. For example, the cloud service can stores any kind of file, such as photos, videos, documents, music, directories, and/or other kinds of application data. These files that can be accessed by via a file or web browser. A user may want to view a file, which requires the file to be downloaded before being viewed, or use an application that stores the files on the cloud service. A user may want download one or more files. Alternatively, there may be background processes that download these files (e.g., photo or music synchronization service, other document or application synchronization services, backup services, and/or other types of services that use cloud services for file storage).

With the use of the operating system services and the other applications on the cloud service to store files for a local client, there can be times when a number of files are downloaded concurrently. For example, a user make have taken a number of photos using the their smartphone during a trip or have purchased a number of songs. These photos or songs can be synchronized to the local client during a time that the user wishes to view a word processing document or spreadsheet stored on the same cloud service. In this example, there may not be enough local client resources to adequately download the photos, songs, and desired word processing document or spreadsheet. Thus, if the synchronization service starts downloading the songs or photos before the user wishes to view the word processing document or spreadsheet, the download of the document or spreadsheet may be needlessly delayed.

SUMMARY OF THE DESCRIPTION

A method and apparatus of a device that downloads an object from a cloud service provider is described. In an exemplary embodiment, the device receives a download request for the object from a process running on a device. The device further determines a priority hint associated with the process for the download request. In addition, the device starts a download process using the download request and the priority hint. Furthermore, the device determines a change in the priority hint of the process during the download. The device additionally changes a characteristic of the download process in response to the change in the priority hint. The device further stores the object.

In a further embodiment, a machine-readable medium device containing executable program instructions which when executed by a data processing device cause the device to perform a method to download a plurality of objects from a cloud service provider. In one embodiment, the method receives a download request for the object from a process running on a device. The method further determines a priority hint associated with the process for the download request. In addition, the method starts a download process using the download request and the priority hint. Furthermore, the method determines a change in the priority hint of the process during the download. The method additionally changes a characteristic of the download process in response to the change in the priority hint. The method further stores the object.

In another embodiment, the priority hint is derived from a characteristic of the process. If the process is a process that submits the download request to view contents of the object, the priority hint is high. If the process is a process that submits the download request in response to a user indication to download the object to the device, the priority hint is medium. If the process is a background process, the priority hint is low. A background process can be selected from the group consisting of a synchronization service and a backup service, where a synchronizing service synchronizes files is selected from the group of photos, music, applications, contacts, calendar entries, and other files.

In a further embodiment, the download process can be staggered with another download process. In addition, the download process downloads the object concurrently with another object downloaded with the another download process.

In yet another embodiment, a method downloads a plurality of objects from a cloud service provider. In one embodiment, the method receives a download request for the object from a process running on a device. The method further determines a priority hint associated with the process for the download request. In addition, the method starts a download process using the download request and the priority hint. Furthermore, the method determines a change in the priority hint of the process during the download. The method additionally changes a characteristic of the download process in response to the change in the priority hint. The method further stores the object.

In another embodiment, the priority hint is derived from a characteristic of the process. If the process is a process that submits the download request to view contents of the object, the priority hint is high. If the process is a process that submits the download request in response to a user indication to download the object to the device, the priority hint is medium. If the process is a background process, the priority hint is low. A background process can be selected from the group consisting of a synchronization service and a backup service, where a synchronizing service synchronizes files is selected from the group of photos, music, applications, contacts, calendar entries, and other files.

In a further embodiment, the download process can be staggered with another download process. In addition, the download process downloads the object concurrently with another object downloaded with the another download process. In another embodiment, a non-transitory machine-readable medium containing executable program instructions which when executed by a data processing device cause the device to perform a method to download a plurality of objects from a cloud service provider. In this embodiment, the method receives a plurality of download requests for the plurality of objects, wherein each of the plurality of download request has a priority derived from a process that submitted that download request. The method further receives a new download request for an object different from the plurality of objects. The method additionally cancels one of the plurality of download requests if the new download request has a priority hint that is greater than the priority hint for the one of the plurality of download requests.

In another embodiment, the method further releases resources associated with the one of the plurality of download requests.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
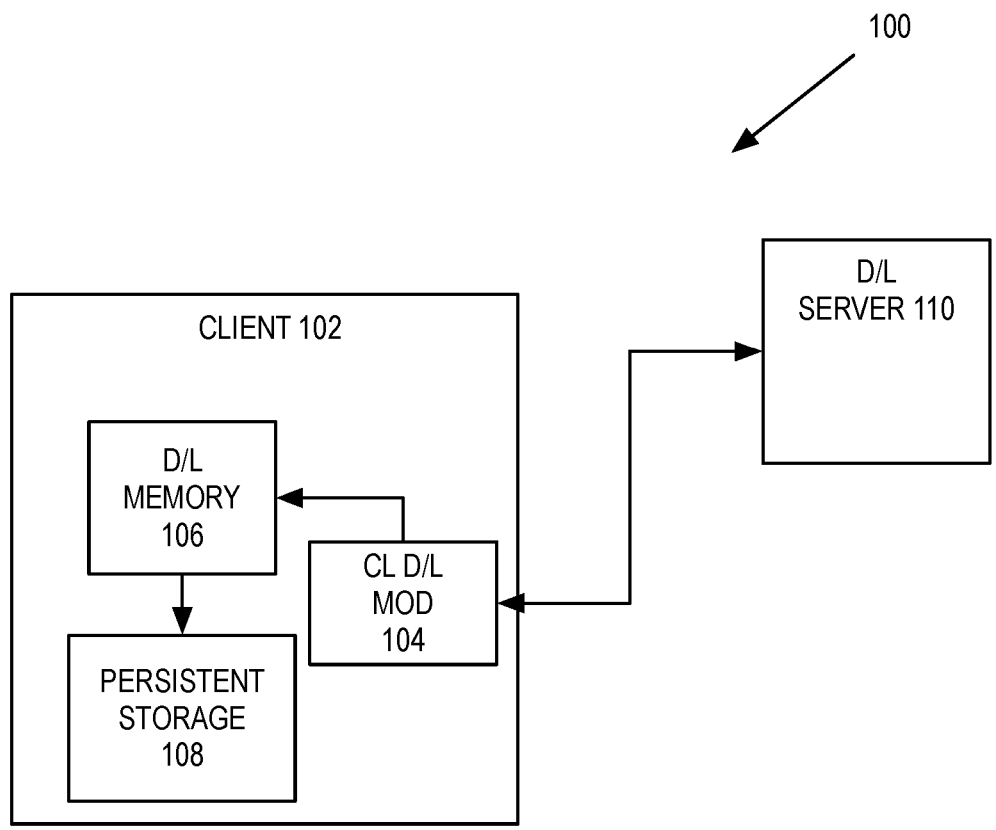
FIG. 1 is a block diagram of one embodiment of a system that downloads objects from a download server to a client.

A method and apparatus of a device that downloads an object from a cloud service provider is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that downloads an object from a cloud service provider is described. In one embodiment, the device handles multiple download requests for objects from a cloud service provider. In this embodiment, each of the download requests has an associated priority that is derived from the process that initiates the download request. For example and in one embodiment, a background process would have a low priority download request. A user process that is copying an object to the device may have a lower medium priority for the download request. The user process that is downloading the object to display the object in a user interface would have a high priority for the download request. Alternatively, the priority of the download request may be derived from a group associated with the object to be downloaded. In this embodiment, the group for the object is derived from the application that can manipulate or created the object (e.g., a word processing group for word processing document, a spreadsheet group for spreadsheet documents, and/or other types of application groups).

In one embodiment, the device can use the download request priorities to schedule and allocate resources for the download requests. For example, a high priority download request maybe scheduled right away with greater allocated resources so that the download can occur more quickly. Examples of device resources that can be allocated for a download are: bandwidth, memory, storage, central processing unit (CPU) and/or graphics processing unit (GPU) processing time, place in a download queue, and/or other types of device resources. Conversely, a lower priority download process can be allocated a less resources for the download. The can be useful for background process download, where time is not a critical factor. In addition, non-high priority download requests can be batched and scheduled by the device. Furthermore, if the priority of the download request changes, the device can reallocate the device resources for the download as needed.

In a further embodiment, the device can handle multiple download requests concurrently. In one embodiment, the device staggers the downloads for these requests by the object download such that one of the object download initially starts in part way through this download, the device starts another object download. Furthermore, if a new download request with a higher priority is submitted to the device, the device can pause or cancel one of the currently running object downloads and free up device resources so that the newly submitted download request can be serviced by the device. In one embodiment, the last requested object download currently running is a candidate to be paused or canceled.

FIG. 1 is a block diagram of one embodiment of a system 100 that downloads objects from a download server to a client. In FIG. 1, the system 100 includes a client 102 and download server 114 coupled by a network (not illustrated). In one embodiment, the download server 114 is a collection of one or more servers that receives download requests from client 102 and/or other devices and returns the object(s) requested back to those devices. In one embodiment, the download service is part of a file hosting service. In one embodiment, the client 102 and/or search server 114 can be personal computer, laptop, server, mobile device (e.g., smartphone, laptop, personal digital assistant, music playing device, gaming device, etc.), and/or any device capable requesting a search and/or displaying search results. In one embodiment, the client 102 and/or search server 114 can be a physical or virtual device.

In one embodiment, the download server 110 is part of a cloud service that stores one or more objects for the client 102. In this embodiment, the client 102 can access these objects via a file browser, web browser, synchronization process, and/or some other type of application or process. In one embodiment, the client 102 accesses the one or more objects by downloading some or all of the content of those objects. In one embodiment and object can be a file, multiple files, directory, multiple directories, files and directories, and/or any other type of object that is accessible from a cloud service. Because there are different ways to access the objects stored on the download server 110, there can be different priorities associated with these access mechanisms. For example and in one embodiment, the user of the client 102 may want to browse to the object on the cloud service through file browser so the that user can view that object. In this embodiment, because the user is indicating that the user wishes to view the object, this action would have a high priority so as to limit the amount of time the user has to wait to view the object. Alternatively, the user could browse to the object so as to download this object to the client 102 for local storage or to use later. Because this action probably does not necessarily need to be an immediate download, the priority of this download would be less than the high priority described above. In a further embodiment, a background process running on the client 102 can access one or more objects stored on the download server 110 and request a download of these objects. Because this is a background process, the priority for this download is low.

In one embodiment, to manage and prioritize download requests of objects from the download server 110, the client 102 utilizes a client download module 104 to manage the down the requests from the various processes 112. In this embodiment, the processes 112 make one or more download requests for objects stored on the download server 110 via the client download module 104. The client download module 104 receive these requests, determines a priority for each of the requests, batches the download requests for processes that do not have a high priority, submits immediate download requests for high priority processes, temporarily stores the data for those objects in the download memory 104, and moves the data for these objects to persistent storage 108. In one embodiment, the download memory 104 is part of a system memory for the client 102. As the download progresses for an object, the data for that object is written to persistent storage 108. In one embodiment, the persistent storage stores the date of the object persistently, even if the power to the client 102 is not available. For example and in one embodiment, the persistent storage 108 can be a flash drive, hard disk drive, and/or some other type of persistent storage.

To manage and prioritize the object download requests, in one embodiment, the client download module 104 receives the download request and schedules the download request using the priority of the download request as a hint. In one embodiment, the priority hint is a priority that the client download module 104 can follow as needed to efficiently process the download request. In this embodiment, a higher priority download requests may have more resources allocated for the requested object download (e.g., greater bandwidth on network connections, increased memory, greater storage, more central processing unit (CPU) and/or graphics processing unit (GPU) processing time, place in a download queue, and/or other types of client 102 resources). Conversely, a lower priority download request may have less client 102 resources allocated for this requested object download.

In one embodiment, the priority of a download request may change while the client download module 104 is handling this download request. In this embodiment, if the client download module 104 detects that the priority of a download request is changed, the client download module 104 can reshuffle the pending download requests or reallocate the resources of this download request whose priority has changed. In one embodiment, the user may browse to a file stored on the download server 110 through a file browser or web browser then double-click on that file so as to view the file. In this embodiment, as the file is being downloaded, the user may navigate away from the part of the file or web browser that displays the reference to this file, which may indicate that the user has moved onto some other task with the client 102.

In one embodiment, the client download module 104 handles multiple download requests by allocating resources for these downloads. In this embodiment, the client download module 104 can stagger the object download such that one of the object download initially starts in part way through this download, the client download module 104 starts another object download. Furthermore, if a new download request with a higher priority is submitted to the client download module 104, the client download module 104 can pause or cancel one of the currently running object downloads and free up client 102 resources so that the newly submitted download request can be serviced by the client download module 104. In one embodiment, the last requested object download currently running is a candidate to be paused or canceled, such that the client download module 104 can service the newly submitted download request.

Figure 2:
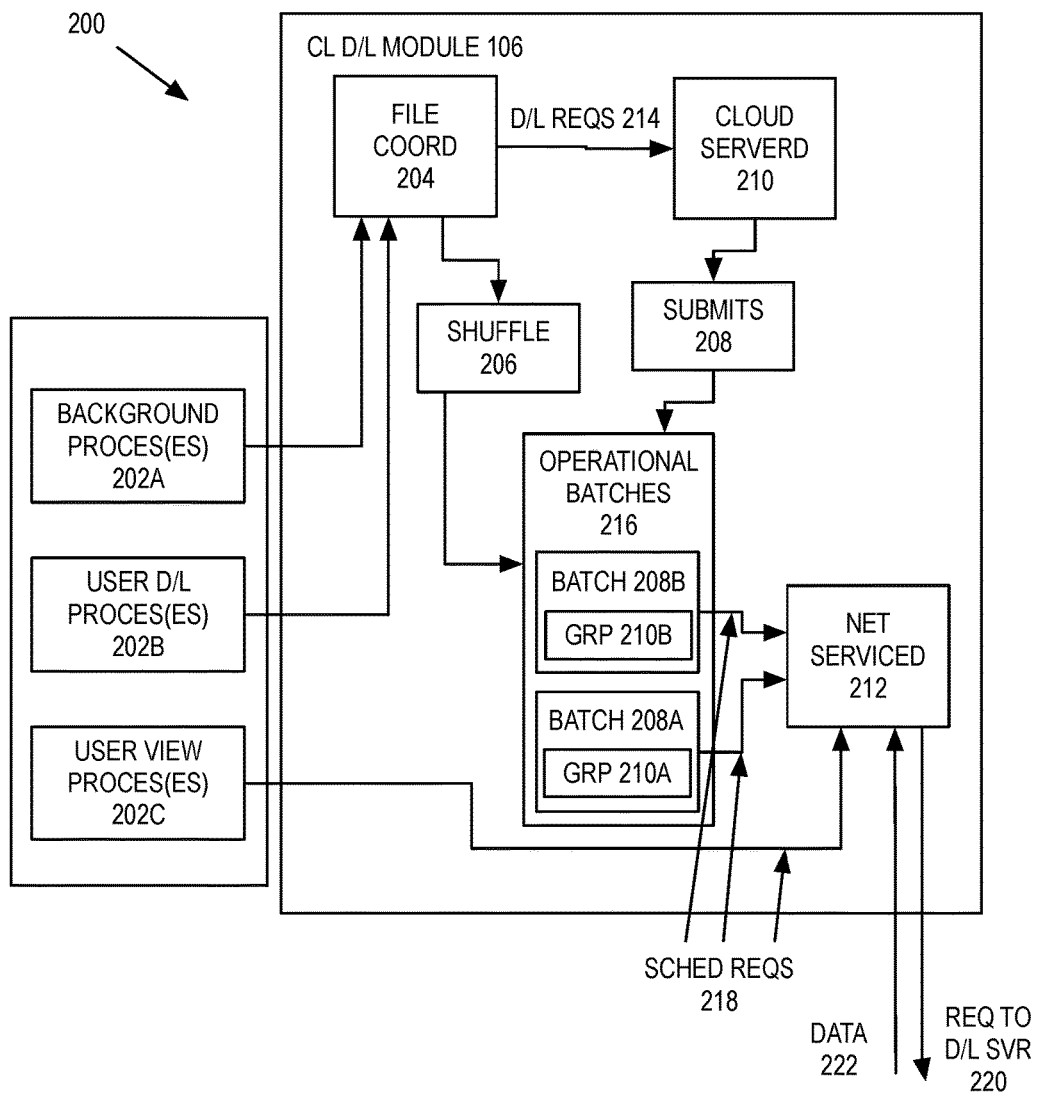
FIG. 2 is a block diagram of one embodiment of a client download module that controls the downloading of objects requests by several different types of processes.

FIG. 2 is a block diagram of one embodiment of a client download module 104 that controls the downloading of objects requests by several different types of processes. In FIG. 2, the client download module 106 includes a file coordination demon 204, cloud server daemon 210, and that network service demon 212. In one embodiment, the client download module 106 routes the download requests to the appropriate component of client download module 106 based on at least the priority of that download request. For example and in one embodiment, download requests having a high priority are directly routed to the network service demon 212. Conversely, download requests not having a high priority are routed to the file coordination demon 204. In one embodiment, the download requests from a background process 202A would have a low priority. A download request from a user initiated download process 202B (e.g., the user copying the file from the cloud service down to client 102) may have a priority that is low to medium. For a process 202C where the user indicates that the user wishes to view the object, the download request would have a high priority. In one embodiment, the high-priority download requests are directly routed to the network service demon 212, such that the requested object is more expeditiously downloaded. For download requests not having a high priority, these download requests are batch together by the client download module 106, so that these non-high-priority download requests can be more efficiently scheduled and make a more efficient use of the client 102 resources.

In one embodiment, the file coordination demon 204 receives the download requests from the processes 202A and 202B and assembles these requests into batches, so that the resources of client 102 can be more efficiently utilized. In addition, the file coordination demon 204 can shuffle 206 these batches as needed (e.g., in response to the priority of download request changing). These batches of download requests are forwarded to the cloud server daemon 210, which assembles these batches of download requests into a set of submits 208 that can be made to the download server 110. In one embodiment, a batch includes files that have the same priority. In this embodiment, if a user explicitly request one of the files in a batch, the cloud server daemon 210 cancels that batch and schedule a new batch that includes the file with the new prioritization and another batch with remaining files of the old batch using the old prioritization. In addition, each batch of download requests can be associated with a group. In one embodiment, the association of a batch of download requests to a group can be based on the type of application associated with the objects for the batch of download requests. For example and in one embodiment, the user may request the download of several word processing documents organized in a folder. In this example, these word processing documents are associated to the word processing program that can process these documents, where the group affiliation for the batch request is based on this word processing program. Furthermore, and in this example, the operational batches 216 include batches 208A-B that have group affiliations of groups 210A-B. these operational batches are submitted to the network service demon 212. The network service demon 212 sends these operational batches of requests to the download server (220). The network service daemon receives the data for these operational batches of requests as the download server makes the data available.

In a further embodiment, if a new download request is received by the client download module 104 and in this new request has a higher priority than the currently scheduled download requests, the network service demon 212 cancel the lower priority download request. In one embodiment, the network service demon releases some or all the resources for this posture cancel download request (e.g., memory, storage space on the persistent storage if there is not enough room for the newly requested downloaded object, and/or some other resources used by the pause/canceled down the request).

Figure 3:
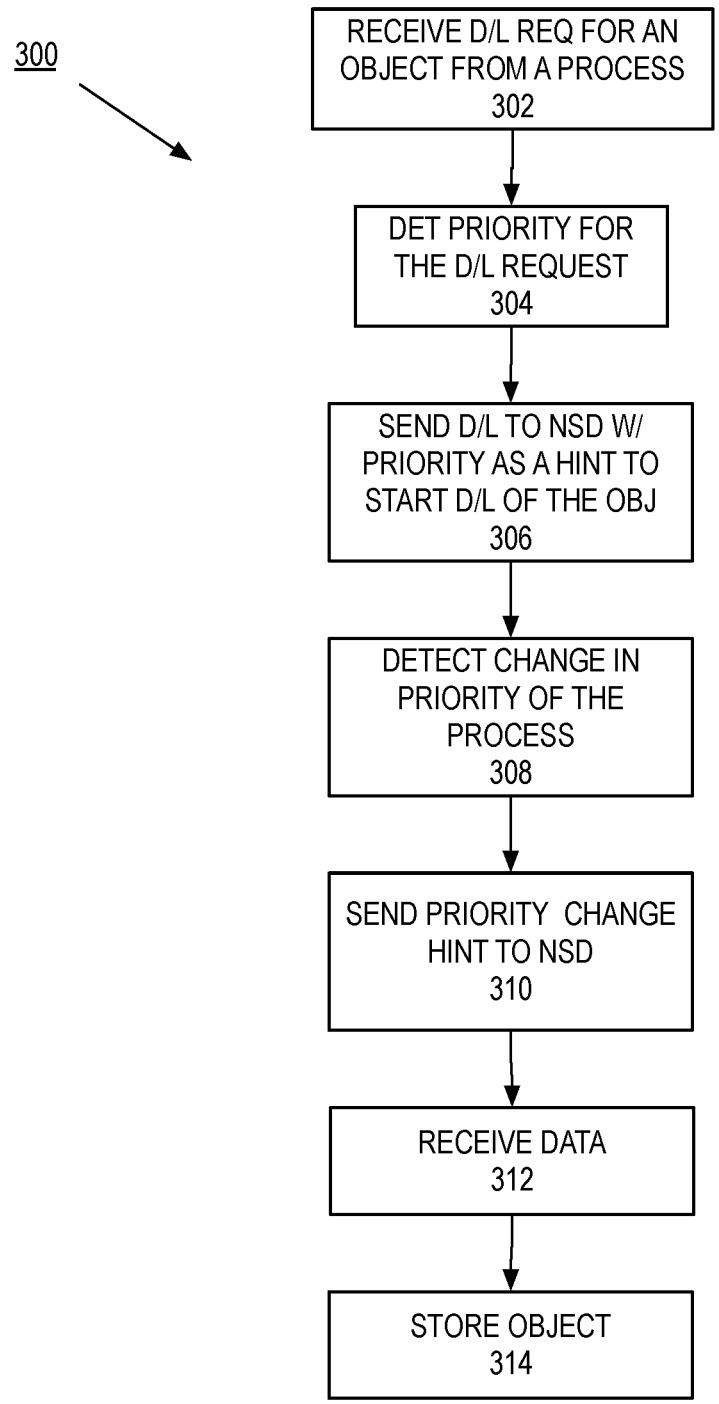
FIG. 3 is flow diagram of one embodiment of a process to handle a download request from a process.

As per above, the client download module can handle download requests, where each of the download requests can have a priority. FIG. 3 is flow diagram of one embodiment of a process 300 to handle a download request from a process. In one embodiment, process 300 is performed by a client download module to handle a download request from a process, such as the client download module 104 as described in FIG. 1 above. In FIG. 3, process 300 begins by receiving a download request for an object from a process of block 302. This process can have a priority depending on the type of process that request of the object download. For example and in one embodiment, the process could be a background process, user process that is copping objects to the local client, the user process that is viewing the object, or some other type of process. At block 304, process 300 determines the priority for the download request. In one embodiment, the priority for the download request is derived from the type of process that made this download request. For example and in one embodiment, a background process would have a low priority download request. A user process that is copying the object to the local device may have a low to medium priority for the download request. The user process that is downloading the object to display the object in a user interface would have a high priority for the download request. Alternatively, the priority of the download request may be derived from a group associated with the object to be downloaded. In this embodiment, the group for the object is derived from the application that can manipulate or created the object (e.g., a word processing group for word processing document, a spreadsheet group for spreadsheet documents, and/or other types of application groups).

At block 306, process 300 sends the download request to the network service demon with the priority as a hint to start the downloading of that object. In one embodiment, the priority hint is a priority that the process 300 can follow as needed to efficiently process the download request. Process 300 can detect a change in the priority of the process for this download request during the object download at block 308. In one embodiment, a high priority download request may be downgraded to a medium or low priority download request if the conditions that made this download request a high priority request have changed. For example and in one embodiment, the user may browse to a file stored on the download server 110 through a file browser or web browser then double-click on that file so as to view the file. In this embodiment, as the file is being downloaded, the user may navigate away from the part of the file or web browser that displays the reference to this file, which may indicate that the user has moved onto some other task with the client. In this example, the priority for the associated download request would be lowered and would not be a high priority download request. Alternatively, the priority download request may be upgraded from a low or medium priority to a medium or high priority.

At block 310, process 300 sends the priority change hint to the network service team. In one embodiment, the network service daemon receives the priority change hint and reallocates resources for this download request as needed. Process 300 receives the data for the object of the download request at block 312. At block 314, process 300 stores the object. In one embodiment, process stores the object in persistent storage.

Figure 4:
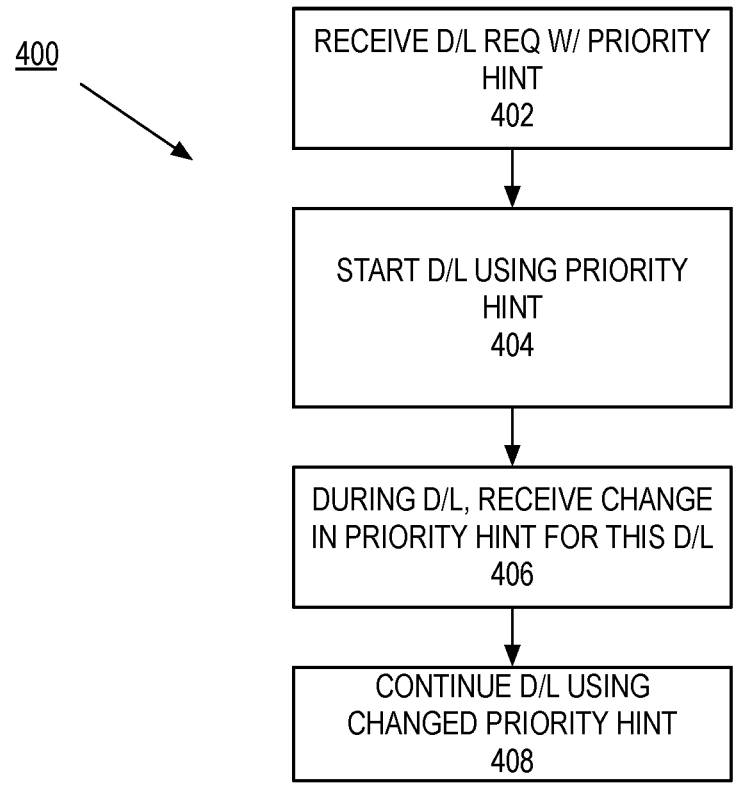
FIG. 4 is flow diagram of one embodiment of a process to handle an object download request.

FIG. 4 is flow diagram of one embodiment of a process 400 to handle an object download request. In one embodiment, process 400 is performed by a network service demon to handle an object down the request, such as the network service demon 212 as described in FIG. 2 above. In FIG. 4, process 400 begins by receiving a download request with the priority hint at block 402. At block 404, process 400 begins the object download using the priority hint. In one embodiment, process 400 uses the priority hint to allocate resources for this object download. If the priority hint for this download request is high, this object download request may have larger network bandwidth, more space in persistent storage, and/or additional download memory assigned to the download request. Alternatively, a lower priority hint for the download request may have a smaller network bandwidth, less memory, and/or less space in persistent storage assigned to this download request. In one embodiment, in addition to allocating resources for the download request, process 400 starts the object download by sending a download request to the download server. In response to the download server receiving the down the request, the download server start sending data for the requested object to process 400. At block 406, and during the object download, process 400 can receive a change in the priority for this download. If process 400 does receive a change in the priorities for this download, process 400 can reallocate the resources for the client for this object download according to the change in the party hint. For example and in one embodiment, if the priority change boosts the priority hint, process 400 may allocate additional resources to this download. Conversely, if the party change reduces the priority hint, process 400 may restrict the resources for this download. At block 408, process 400 continues downloading the object using the changed priorities hint.

Figure 5:
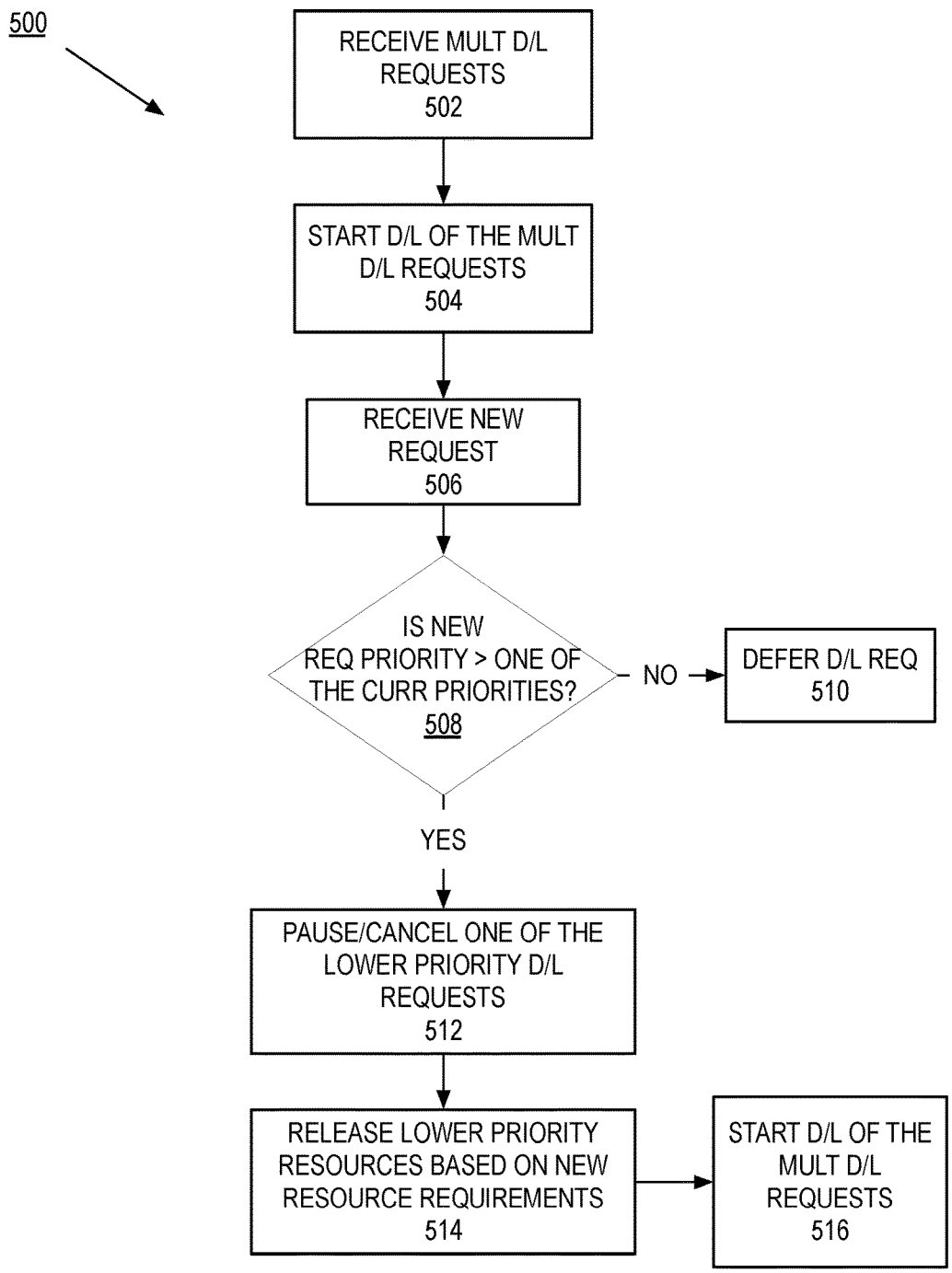
FIG. 5 is flow diagram of one embodiment of a process to handle multiple download requests.

FIG. 5 is flow diagram of one embodiment of a process 500 to handle multiple download requests. In one embodiment, process 500 is performed by a multiple download module to handle multiple download requests, such as the multiple download module 900 as described in FIG. 9 below. In FIG. 5, process 500 begins by receiving multiple download requests at block 502. At block 504, process 500 starts the download of the objects for the multiple download requests. In one embodiment, process 500 can perform the downloading of these objects concurrently. In a further embodiment, process 500 staggers the download of these objects by starting the download of one of the objects and starting a download of another object partway through the download of the first object. Staggering the download of the objects is further described in FIG. 6 below. At block 506, process 500 receives a new download request. In one embodiment, process 500 receives the new download request while the download of the objects started in 504 is occurring. At block 508, process 500 determines if the new request priority is greater than one of the current download priorities. If the new download request priority is not greater than one of the current download parties, at block 510, process 500 refers the new download request. If the new download request priority is greater then one of the current download request priorities, process 500 pauses or cancels one of the lower priority download requests at block 512. Process 500 releases the lower priority resources based on the new party apartments at block 514. In one embodiment, process 500 analyzes the resource requirements for the new download request and releases the resources used by the lower priority request as needed. For example and in one embodiment, process 500 releases the download memory used for the lower priority download request, so as to use this memory for the new download request. As another example, process 500 removes the data used by the lower priority download request in persistent storage if there is not enough room for the object for the new download request. Process 500 starts the download of the object for the new download request at block 516.

Figure 6:
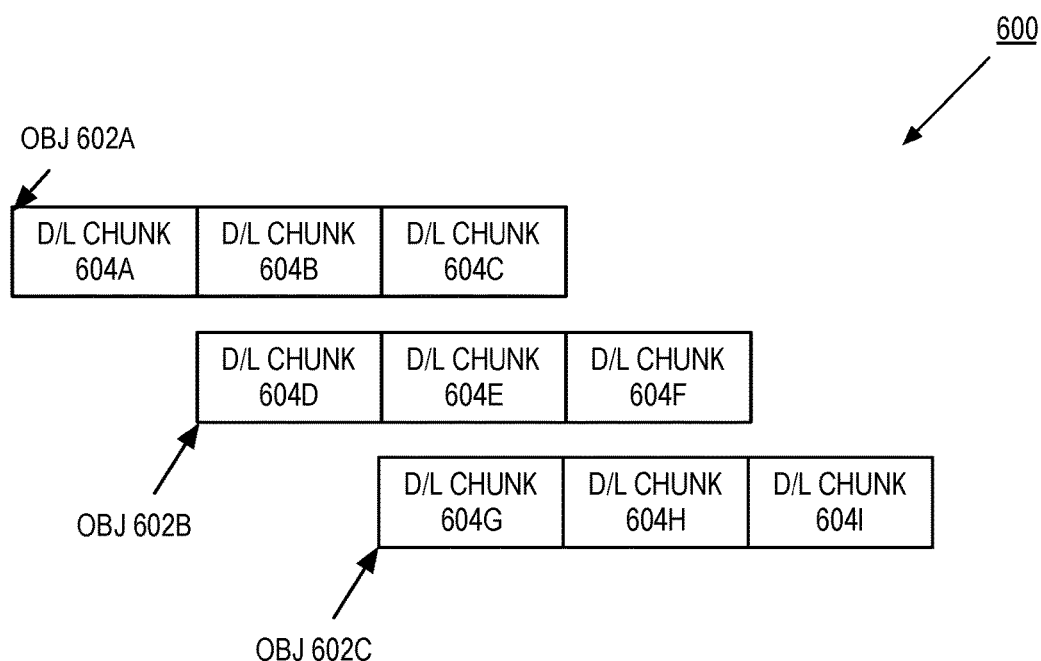
FIG. 6 is an illustration of one embodiment of staggering multiple downloads.

FIG. 6 is an illustration of one embodiment of staggering multiple downloads. In FIG. 6, three download requests are scheduled for objects 602A-C, which are subdivided into download chunks. For example and in one embodiment, object 602A includes download chunks 604A-C, object 602B includes download chunks 604D-F, and object 602C includes download chunks 604G-I. in one embodiment, the client staggers the download for the objects 602A-C, by starting the download of object 602A. When download chunk 604A is downloaded, the client starts the download for object 602B and continues the downloading of chunks 604B-C. When the download chunk 604D is completed, the client starts the download for object 602C and continues the downloading of chunks 604C, 604E, and 604F.

Figure 7:
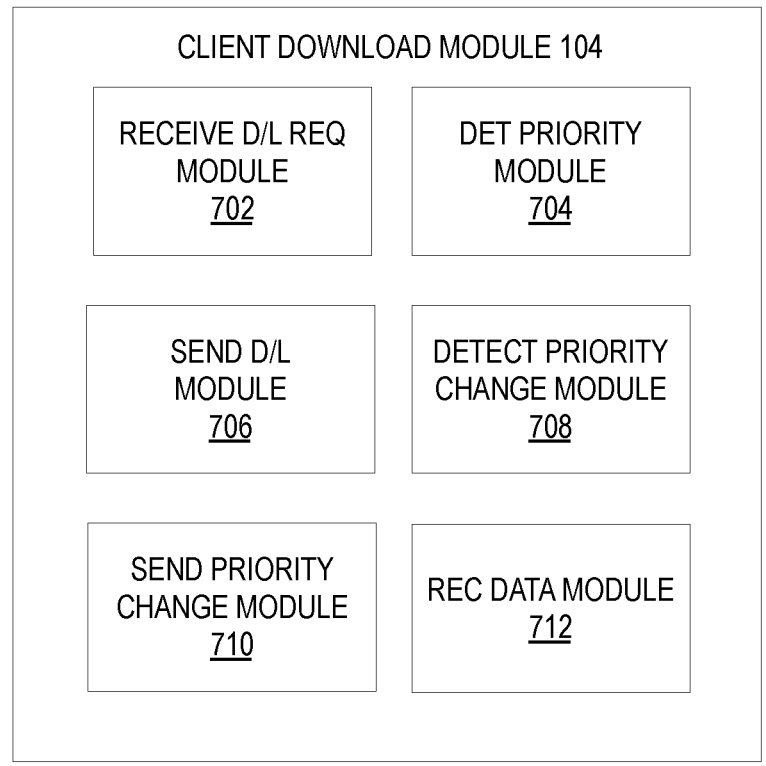
FIG. 7 is a block diagram of one embodiment of a client download module that handles a download request from a process.

FIG. 7 is a block diagram of one embodiment of a client download module 104 that handles a download request from a process. In one embodiment, the client download module 104 includes received download request module 702, determine priority module 704, send download module 706, detect priority change module 708, send priority change module 710, and receive data module 712. In one embodiment, the received download request module 702 receives a download request for an object from a process as described in FIG. 3, block 302 above. The determine priority module 704 determines a priority for the download request as described in FIG. 3, block 304 above. The send download module sends the download request to the network service daemon as described in FIG. 3, block 306 above. The detected priority change module 708 detects a change in the priority of the process as described in FIG. 3, block 308 above. The sent priority change module 710 sends a priority change hint to the network service demon as described in FIG. 3, block 310 above. The received data module 712 receives the object data as described in FIG. 3, block 312 above.

Figure 8:
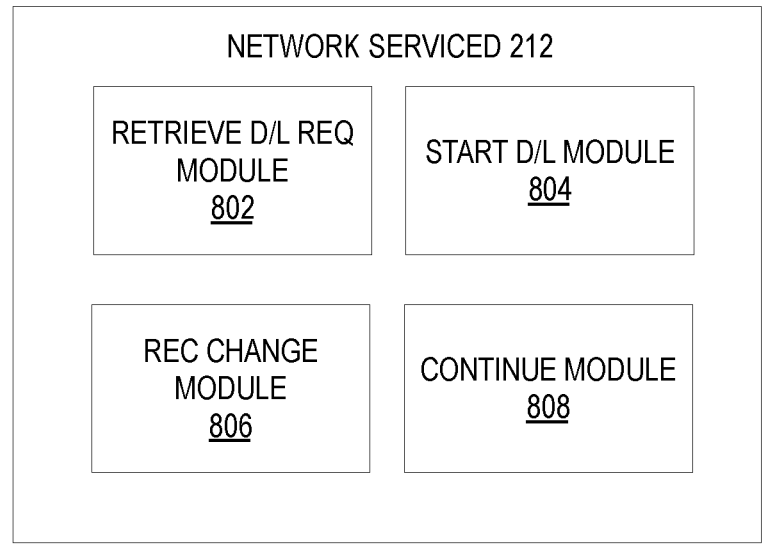
FIG. 8 is a block diagram of one embodiment of network service daemon that handles an object download request.

FIG. 8 is a block diagram of one embodiment of network service daemon 212 that handles an object download request. In one embodiment, the network service daemon 212 includes a receive download request module 802, start download module 804, received change module 806, and continue module 808. In one embodiment, the receive download request module 802 receives the download request as described in FIG. 4, block 402 above. The start download module 804 starts the download using the priority hint as described in FIG. 4, block 404 above. The receive change module receives a change in the priority hint has described in FIG. 4, block 406 above. The continue module continues the download as described in FIG. 4, block 408 above.

Figure 9:
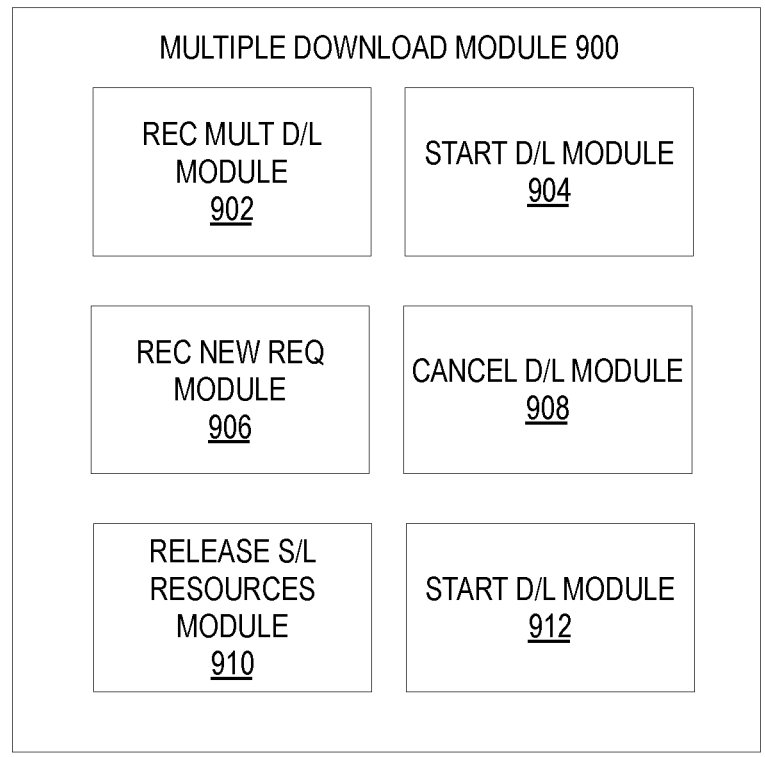
FIG. 9 is a block diagram of one embodiment of a multiple download module that handles multiple download requests.

FIG. 9 is a block diagram of one embodiment of a multiple download module 900 that handles multiple download requests. In one embodiment, the multiple download module 900 includes receive multiple download module 902, start download module 904, receive new request module 906, cancel download module 908, release download resources module 910, and start download module 912. In one embodiment, the receive multiple download module 902 receives multiple download requests as described in FIG. 5, block 502 above. The start download module 904 starts the multiple download requests as described in FIG. 5, block 504 above. The receive new request module 906 receives the new request as described in FIG. 5, block 506 above. The cancel download module 908 pauses or cancels a download as described in FIG. 5, block 512 above. The release download resources module 910 releases the client resources as described in FIG. 5, block 514 above. The start new download module 512 starts the download of the new download request as described in FIG. 5, block 516 above.

Figure 10:
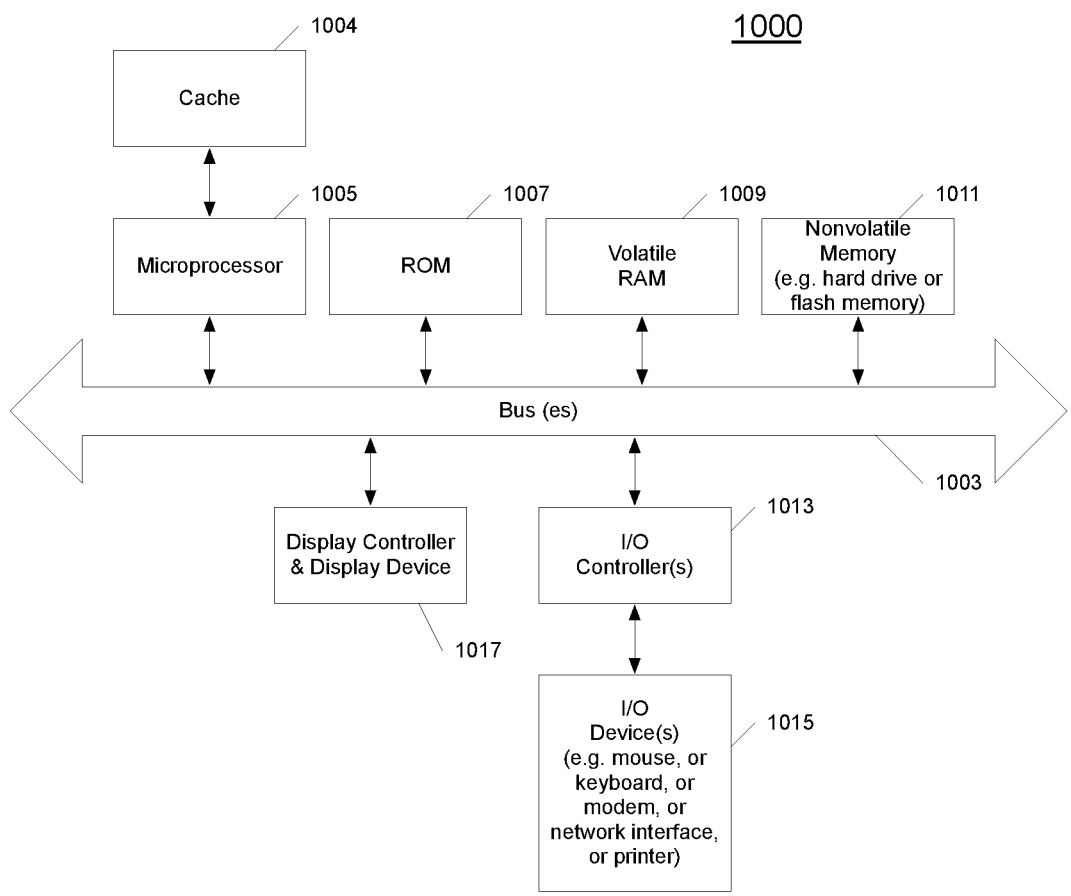
FIG. 10 illustrates one example of a typical computer system, which may be used in conjunction with the embodiments described herein.

FIG. 10 shows one example of a data processing system 1000, which may be used with one embodiment of the present invention. For example, the system 1000 may be implemented including a client 102 as shown in FIG. 1. Note that while FIG. 10 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 may include one or more CPU(s), GPU(s), a specialized processor, and/or a combination thereof. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1017 and to peripheral devices such as input/output (I/O) devices which may be mice, keyboards, modems, network interfaces, printers and other devices which are well known in the art. Typically, the input/output devices 1015 are coupled to the system through input/output controllers 1013. The volatile RAM (Random Access Memory) 1009 is typically implemented as dynamic RAM (DRAM), which requires power continually in order to refresh or maintain the data in the memory.

The mass storage 1011 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Figure 11:
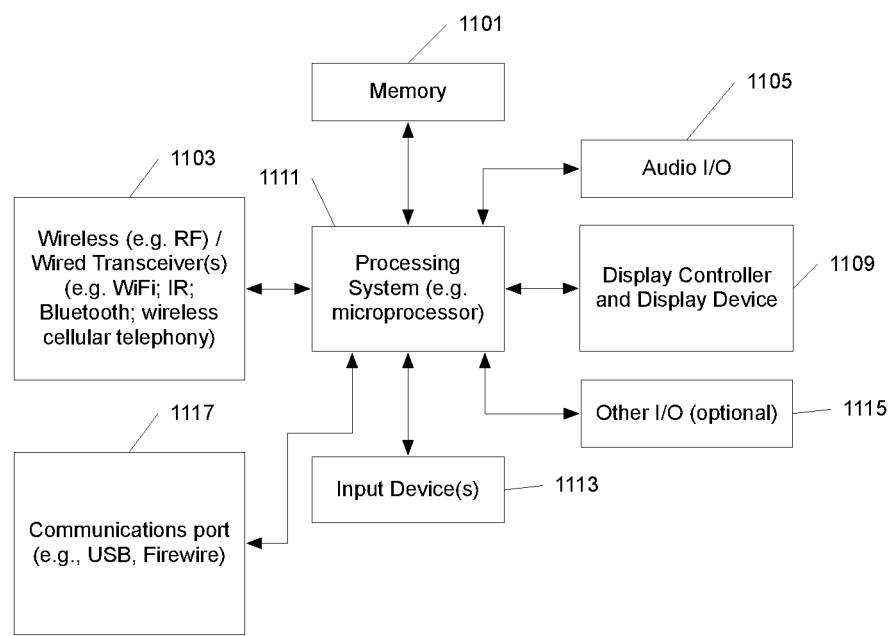
FIG. 11 shows an example of a data processing system, which may be used with one embodiment of the present invention.

FIG. 11 shows an example of another data processing system 1100 which may be used with one embodiment of the present invention. For example, system 1100 may be implemented as a client 102 as shown in FIG. 1. The data processing system 1100 shown in FIG. 11 includes a processing system 1111, which may be one or more microprocessors, or which may be a system on a chip integrated circuit, and the system also includes memory 1101 for storing data and programs for execution by the processing system. The system 1100 also includes an audio input/output subsystem 1105, which may include a microphone and a speaker for, for example, playing back music or providing telephone functionality through the speaker and microphone.

A display controller and display device 1109 provide a visual user interface for the user; this digital interface may include a graphical user interface which is similar to that shown on a Macintosh computer when running OS X operating system software, or Apple iPhone when running the iOS operating system, etc. The system 1100 also includes one or more wireless transceivers 1103 to communicate with another data processing system, such as the system 1100 of FIG. 11. A wireless transceiver may be a WLAN transceiver, an infrared transceiver, a Bluetooth transceiver, and/or a wireless cellular telephony transceiver. It will be appreciated that additional components, not shown, may also be part of the system 1100 in certain embodiments, and in certain embodiments fewer components than shown in FIG. 11 may also be used in a data processing system. The system 1100 further includes one or more communications ports 1117 to communicate with another data processing system, such as the system 1500 of FIG. 15. The communications port may be a USB port, Firewire port, Bluetooth interface, etc.

The data processing system 1100 also includes one or more input devices 1113, which are provided to allow a user to provide input to the system. These input devices may be a keypad or a keyboard or a touch panel or a multi touch panel. The data processing system 1100 also includes an optional input/output device 1115 which may be a connector for a dock. It will be appreciated that one or more buses, not shown, may be used to interconnect the various components as is well known in the art. The data processing system shown in FIG. 11 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1100 may be a network computer or an embedded processing device within another device, or other types of data processing systems, which have fewer components or perhaps more components than that shown in FIG. 11.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "ranking," "receiving," "determining," "computing," "starting," "changing," "storing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

The invention claimed is:

1. A non-transitory machine-readable medium containing executable program instructions which when executed by a device cause the device to perform a method comprising:
receiving, from one or more processes running on the device, a plurality of download requests, wherein each download request corresponds to a request for a respective object;
determining a priority hint associated with a process running on the device;
scheduling, based on at least the priority hint associated with the process, a download request from the plurality of download requests;
based on the scheduling of the download request, starting a download process using the scheduled download request to download an object corresponding to the download request;
determining that a change has occurred in the priority hint during the download process;
based on determining that the change occurred, changing a characteristic of the download process; and
storing the object corresponding to the download process.

2. The machine-readable medium of claim 1, wherein the priority hint is derived from a characteristic of the process.

3. The machine-readable medium of claim 2, wherein the priority hint is high if the process is a process that submits the download request to view contents of the object.

4. The machine-readable medium of claim 2, wherein the priority hint is medium if the process is a process that submits the download request in response to a user indication to download the object to the device.

5. The machine-readable medium of claim 2, wherein the priority hint is low if the process is a background process.

6. The machine-readable medium of claim 5, wherein the process is selected from the group consisting of a synchronization service and a backup service.

7. The machine-readable medium of claim 6, wherein the synchronization service synchronizes files is selected from the group of photos, music, applications, contacts, calendar entries, and files.

8. The machine-readable medium of claim 1, wherein the download process can be staggered with another download process.

9. The machine-readable medium of claim 8, wherein the download process downloads the object concurrently with another object downloaded with the other download process.

10. A method comprising:
receiving, from one or more processes running on the device, a plurality of download requests wherein each download request corresponds to a request for a respective object;
determining a priority hint associated with a process running on the device;
scheduling, based on at least the priority hint associated with the process, a download request from the plurality of download requests;
based on the scheduling of the download request, starting a download process using the scheduled download request to download an object corresponding to the download request;
determining that a change has occurred in the priority hint during the download process;
based on determining that the change occurred, changing a characteristic of the download process; and
storing the object corresponding to the download process.

11. The method of claim 10, wherein the priority hint is derived from a characteristic of the process.

12. The method of claim 11, wherein the priority hint is high if the process is a process that submits the download request to view contents of the object.

13. The method of claim 11, wherein the priority hint is medium if the process is a process that submits the download request in response to a user indication to download the object to the device.

14. The method of claim 11, wherein if the process is a background process.

15. The method of claim 14, wherein the process is selected from the group consisting of a synchronization service and a backup service.

16. The method of claim 15, wherein the synchronization service synchronizes files is selected from the group of photos, music, applications, contacts, calendar entries, and files.

17. The method of claim 1, wherein the download process can be staggered with another download process.

18. The method of claim 17, wherein the download process download the object concurrently with another object downloaded with the other download process.

19. A non-transitory machine-readable medium
containing executable program instructions which when executed by a data processing device cause the device to perform a method comprising:
receiving a plurality of download requests for the plurality of objects, wherein each of the plurality of download requests has a priority hint derived from a process that submitted that download request;
scheduling, based on at least the priority hint associated with the process, a download request from the plurality of download requests;
based on the scheduling of the download request, starting a download process using the scheduled download request to download an object corresponding to the download request;
determining that a change has occurred in the priority hint during the download process;
based on determining that the change occurred, changing a characteristic of the download process;
receiving a new download request for an object different from the plurality of objects; and
canceling the scheduled download request if the new download request has a priority hint that is greater than the priority hint for the one of the plurality of download requests.

20. The machine-readable medium of claim 19, further comprising:
releasing resources associated with the one of the plurality of download requests.

21. The machine-readable medium of claim 1, further comprising:
batching a set of download requests from the plurality of download requests, wherein the set of download requests each has a priority hint that is lower than a higher priority hint than another one of the plurality of download requests.

* * * * *